Oct. 29, 1929.   C. GERBEN   1,733,959

EMERGENCY TIRE FOR VEHICLES

Filed June 7, 1928

Inventor
Charles Gerben
By his Attorney
Francis E. Boyce

Patented Oct. 29, 1929

1,733,959

UNITED STATES PATENT OFFICE

CHARLES GERBEN, OF NEW YORK, N. Y.

EMERGENCY TIRE FOR VEHICLES

Application filed June 7, 1928. Serial No. 283,499.

This invention relates to an emergency tire for vehicles, the object of the invention being to provide a tire which can be quickly and easily placed in position over a deflated or "flat" tire thus taking the weight of the vehicle off the latter so that the vehicle may continue on its way without injury to the deflated tire.

A further object of the invention is to provide a tire of this character which is separable into a plurality of segments whereby it can be stored in a comparatively small space.

With the foregoing and other objects in view, which will appear as the description proceeds, the invention consists in the novel features of construction and combination of parts which will be more fully described hereinafter and particularly pointed out in the claim.

In the drawings accompanying and forming part of this specification,

The same characters of reference designate the same parts in the different figures of the drawings.

Figure 1:
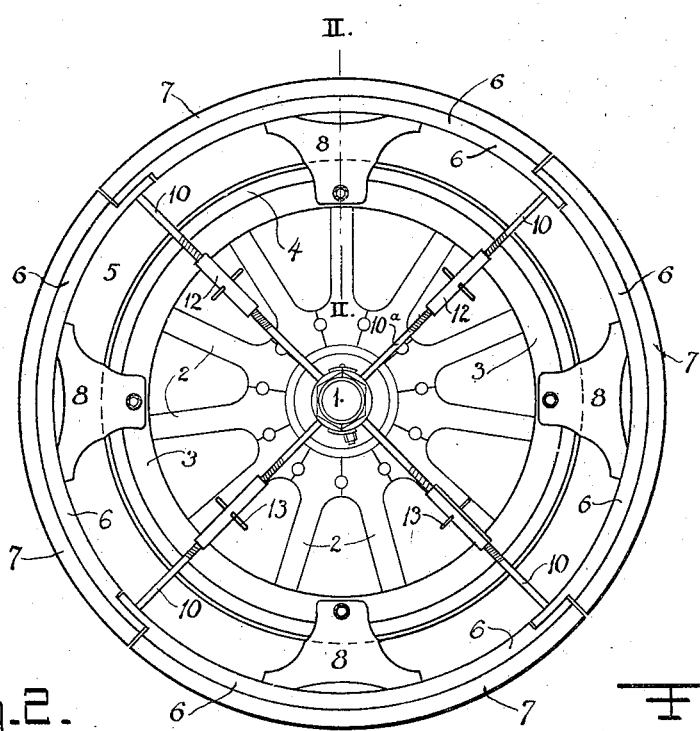
Fig. 1 is a side elevation of an automobile wheel having my improved emergency tire applied thereto.
Figure 2:
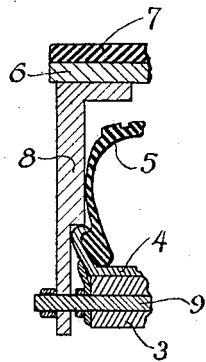
Fig. 2 is a detail sectional view, on an enlarged scale, taken approximately on the line II—II of Fig. 1.
Figure 3:
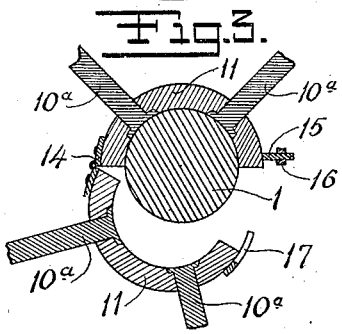
Fig. 3 is a transverse sectional view taken approximately on the line III—III of Fig. 4, looking in the direction of the arrows.
Figure 4:
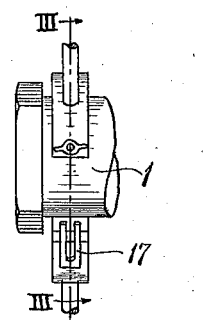
Fig. 4 is a broken away side view of the hub of a wheel illustrating the manner in which the device is secured thereto.

Referring to the drawings, 1 designates the hub of a wheel, 2 the spokes, and 3 the felly, the usual metal rim being designated 4 and the shoe or casing 5 in which is carried the inflated inner tube, not shown. Only a conventional form of wheel is shown, it being understood that the device forming the subject-matter of the present invention is capable of use in connection with the wheels of any motor vehicle.

The emergency tire comprises a plurality of metallic arc-shaped members or segments 6 adapted to form, when assembled, a complete rim, each of said segments having secured to its outer periphery a similar segment of solid rubber 7. In the present instance the rim is shown as made up of four such members, but it will be obvious that it may be divided into six or any other suitable number depending on the particular wheel with which it is to be used. In practice the segments are "halved" at their ends in such manner that adjacent segments overlap at their ends thereby properly to "break joints" as shown in Fig. 1. For securing the device to the vehicle wheel, each of the metal segments is provided approximately at the center of its length with a lug 8 extending radially therefrom toward the axis of rotation of the wheel, each of said lugs being provided with a perforation for the passage of one of the usual rim bolts 9 of the wheel, it being understood that the perforations of the lugs are sufficiently far from the metal segments so that when the lugs are bolted to the felly 3, the metal segments are maintained at such a distance from the rim 4 of the wheel as to accommodate a flat or partly deflated tire between said rim and metal segments so that when the device is in use none of the weight of the vehicle will be borne by the deflated tire.

In order to afford further rigidity to the segments 6 and prevent them from pivoting on the bolts 9, I have provided stays in the form of tie rods connecting the metal segments 6 with the hub of the wheel. Each of the segments has secured near one end thereof one member or half 10 of a tie rod, the other half 10ª of which is secured in one half of a hinged split ring 11, the opposing, oppositely threaded ends of the members 10 and 10ᵃ being engaged by an interiorly threaded sleeve 12 as in any well known tie rod. If desired, a transverse pin 13 may be secured in each of the sleeves 12 for rotating the sleeve, or the pin may be omitted and the sleeve merely provided with a transversely extending perforation approximately at the center of its length for the reception of a tool. The halves of the ring 11 are hinged together at 14, one of said halves being provided at its free end with a threaded pin 15 and a wing nut 16, while the other is provided with a bifurcated member 17 adapted to straddle said pin when the halves are swung together.

It is believed that the operation of the device will be clear from the foregoing.

Upon the discovery of a flat tire, the driver of the vehicle will first clamp the ring 11 to the hub of the wheel. He will then remove the nut from one of the rim bolts and place one of the segments 6 of the emergency tire over the flat tire with the perforation in its lug 8 in position to receive the bolt, and the nut replaced. An extra long set of rim bolts may be provided for this purpose. The portion 10 and 10ᵃ of the tie rod are then coupled together in the sleeve 12 and adjusted to the required length. The next two segments are applied in the same manner and the car is then moved sufficiently to cause that portion of the flat tire which was in contact with the road when the car stopped, to move up into position to have the last segment applied thereto. The vehicle can then continue on its way without danger of damaging the flat tire. After it has accomplished its purpose the emergency tire can be removed and stored in a comparatively small space in the car. It is frequently inconvenient and sometimes impossible to repair a flat tire on the road, and as often happens, if there is no spare tire it becomes necessary either to wait until help can be obtained or to drive on the flat tire, which of course is very injurious to the tire. Moreover, even though the vehicle may be equipped with a spare tire, if the driver is a woman the changing of a tire is too great a tax on her strength and many would prefer to run on the flat tire, even at the risk of ruining it, than either to attempt to change it or to wait for assistance. The present invention is intended to meet this situation and to furnish a device which can be quickly and easily applied by a woman and which will permit the vehicle to continue on its way without the necessity of removing the flat tire and without risk of injuring the latter.

Having thus described my invention, what I claim is:

The combination with a vehicle wheel, of an emergency tire comprising a plurality of segments, a lug carried by each of said segments approximately midway of its length, said lug extending radially from the inner periphery of the segment and having a perforation adapted to engage one of the rim bolts of the wheel, the lugs being of such length as to maintain the segments radially spaced from the rim of the wheel, adjacent segments overlapping each other, and stay rods adapted to engage the hub and secured to the segments at their overlapping portions.

In testimony whereof I have signed my name to this specification.

CHARLES GERBEN.